United States Patent
Sendig et al.

(10) Patent No.: US 10,380,297 B2
(45) Date of Patent: *Aug. 13, 2019

(54) INTEGRATED CIRCUIT DESIGN USING GENERATION AND INSTANTIATION OF CIRCUIT STENCILS

(71) Applicant: Synopsys, Inc., Mountain View, CA (US)

(72) Inventors: Friedrich Gunter Kurt Sendig, San Jose, CA (US); Donald John Oriordan, Sunnyvale, CA (US); Jonathan Lee Sanders, Santa Clara, CA (US); Salem Lee Ganzhorn, Apex, NC (US); Barry Andrew Giffel, Wake Forest, NC (US); Hsiang-Wen Jimmy Lin, Menlo Park, CA (US)

(73) Assignee: Synopsys, Inc., Mountain View, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/809,869

(22) Filed: Nov. 10, 2017

(65) Prior Publication Data

US 2018/0089340 A1    Mar. 29, 2018

Related U.S. Application Data

(63) Continuation of application No. 15/442,338, filed on Feb. 24, 2017, now Pat. No. 10,078,715, and a
(Continued)

(51) Int. Cl.
*G06F 17/50* (2006.01)
*H03K 19/00* (2006.01)

(52) U.S. Cl.
CPC ........ *G06F 17/504* (2013.01); *G06F 17/5036* (2013.01); *G06F 17/5068* (2013.01);
(Continued)

(58) Field of Classification Search
None
See application file for complete search history.

(56) References Cited

U.S. PATENT DOCUMENTS

| | | | |
|---|---|---|---|
| 5,095,441 A | * | 3/1992 | Hopper ................ G06F 17/505 716/104 |
| 6,662,149 B1 | | 12/2003 | Devgan et al. |

(Continued)

FOREIGN PATENT DOCUMENTS

KR    10-2004-0048736 A    6/2004

OTHER PUBLICATIONS

PCT International Search Report and Written Opinion, PCT Application No. PCT/US17/19401, dated May 5, 2017, 17 pages.
(Continued)

*Primary Examiner* — Leigh M Garbowski
(74) *Attorney, Agent, or Firm* — Fenwick & West LLP

(57) ABSTRACT

Embodiments relate to designing of integrated circuits using generation and instantiation of circuit stencils. The circuit stencil represents an abstracted version of the circuit segment. The circuit stencils include collapsed versions of the connectivity information of components and nodes of the integrated circuit. The collapsed version of the connectivity information is generated by analyzing functionality of the circuit segment and removing or replacing at least one redundant component or node of the circuit segment without modifying the functionality. The circuit stencil is used for instantiating or referencing components into a second integrated circuit.

20 Claims, 8 Drawing Sheets

Related U.S. Application Data continuation of application No. 15/442,019, filed on Feb. 24, 2017, now Pat. No. 10,102,324.

(60) Provisional application No. 62/300,594, filed on Feb. 26, 2016, provisional application No. 62/299,968, filed on Feb. 25, 2016.

(52) U.S. Cl.
CPC ...... *G06F 17/5072* (2013.01); *G06F 17/5077* (2013.01); *G06F 17/5081* (2013.01); *H03K 19/00* (2013.01); *G06F 2217/06* (2013.01); *G06F 2217/66* (2013.01); *G06F 2217/74* (2013.01)

(56) References Cited

U.S. PATENT DOCUMENTS

| | | | |
|---|---|---|---|
| 6,968,524 | B2 | 11/2005 | Jiang et al. |
| 7,184,040 | B1 | 2/2007 | Tzvetkov |
| 7,496,884 | B2 | 2/2009 | Fang et al. |
| 7,579,606 | B2 | 8/2009 | Yoshida et al. |
| 7,620,743 | B2 | 11/2009 | Gehman et al. |
| 7,877,376 | B2 * | 1/2011 | Thiyagarajan .... G06F 16/24539 707/717 |
| 7,900,174 | B2 | 3/2011 | Shankar et al. |
| 8,037,433 | B2 | 10/2011 | Chidambarrao et al. |
| 8,112,729 | B2 | 2/2012 | Tonti et al. |
| 8,316,335 | B2 | 11/2012 | Barowski et al. |
| 8,443,329 | B2 | 5/2013 | McConaghy |
| 8,533,650 | B2 | 9/2013 | Arsintescu et al. |
| 8,621,409 | B2 | 12/2013 | Lee et al. |
| 8,732,640 | B1 | 5/2014 | Krishnan et al. |
| 8,739,124 | B2 | 5/2014 | Ritter et al. |
| 8,745,571 | B2 | 6/2014 | Li et al. |
| 8,769,456 | B1 | 7/2014 | Krishnan et al. |
| 8,789,008 | B2 | 7/2014 | Chen |
| 9,262,578 | B2 | 2/2016 | Wang et al. |
| 9,779,193 | B1 | 10/2017 | Ginetti et al. |
| 10,102,324 | B2 | 10/2018 | Oriordan et al. |
| 2004/0243373 | A1 | 12/2004 | Sercu et al. |
| 2007/0055953 | A1 | 3/2007 | Fang et al. |
| 2007/0268731 | A1 | 11/2007 | Weiland et al. |
| 2008/0128637 | A1 | 6/2008 | Yoshida et al. |
| 2009/0288055 | A1 | 11/2009 | Shankar et al. |
| 2010/0050138 | A1 | 2/2010 | Chidambarrao et al. |
| 2010/0269075 | A1 | 10/2010 | Tonti et al. |
| 2012/0066542 | A1 | 3/2012 | Chen et al. |
| 2012/0066659 | A1 | 3/2012 | Chen et al. |
| 2012/0210283 | A1 | 8/2012 | Li et al. |
| 2013/0290916 | A1 | 10/2013 | Lee et al. |
| 2014/0007051 | A1 | 1/2014 | Ritter et al. |
| 2015/0154333 | A1 | 6/2015 | Chai et al. |
| 2015/0310158 | A1 | 10/2015 | Wang et al. |
| 2016/0125115 | A1 | 5/2016 | Strang et al. |
| 2016/0140279 | A1 | 5/2016 | Zhu et al. |
| 2017/0169146 | A1 | 6/2017 | Chen et al. |

OTHER PUBLICATIONS

PCT International Search Report and Written Opinion, PCT Application No. PCT/US17/19466, dated May 8, 2017, 16 pages.

United States Office Action, U.S. Appl. No. 15/442,338, dated Jan. 26, 2018, 10 pages.

United States Office Action, U.S. Appl. No. 15/442,019, dated Jan. 19, 2018, 11 pages.

Kundert, K. et al., "Design of Mixed-Signal Systems-on-a-Chip," IEEE Transactions on CAD of ICs and Systems, Dec. 2000, pp. 1561-1571, vol. 19, No. 12.

European Extended Search Report, European Application No. 17757322.7, dated Jun. 4, 2018, 12 pages.

Liao, T. et al., "Analog Integrated Circuit Sizing and Layout Dependent Effects: A Review," Microelectronics and Solid State Electronics, Jan. 2014, pp. 17-29, vol. 3 (1A), [Online] [Retrieved on Apr. 5, 2018] Retrieved from the Internet<URL:http://www.sapub.org/global/showpaperpdf.aspx?doi=10.5923/s.msse.201401.03>.

European Extended Search Report, European Application No. 17757357.3, dated Jun. 11, 2018, 11 pages.

Naiknaware, R. et al., "Schematic Driven Module Generation for Analog Circuits with Performance Optimization and Matching Considerations," Proceedings of the IEEE 1998 Custom Integrated Circuits Conference, May 11, 1998, pp. 481-484.

Rencher, M. et al., "Full Custom Layout Design Automation Using Schematic Driven Layout," 8182 Motorola Technical Developments, Dec. 1991, pp. 17-20, vol. 14.

* cited by examiner

INTEGRATED CIRCUIT DESIGN USING GENERATION AND INSTANTIATION OF CIRCUIT STENCILS

CROSS REFERENCE TO RELATED APPLICATION

This application is a continuation of U.S. application Ser. No. 15/442,338, filed Feb. 24, 2017, now U.S. Pat. No. 10,078,715, which claims the benefit of U.S. Provisional Application No. 62/300,594, filed Feb. 26, 2016 and U.S. Provisional Application No. 62/299,968, filed Feb. 25, 2016, both of which are incorporated by reference in their entirety.

This application is also a continuation of U.S. application Ser. No. 15/442,019, filed Feb. 24, 2017, which claims the benefit of U.S. Provisional Application No. 62/300,594, filed Feb. 26, 2016 and U.S. Provisional Application No. 62/299,968, filed Feb. 25, 2016, both of which are incorporated by reference in their entirety.

BACKGROUND

Field of the Disclosure

The present disclosure generally relates to designing of integrated circuits (ICs), and specifically to designing of ICs based on generation and instantiation or referencing of circuit stencils.

Description of the Related Arts

A design flow for ICs typically includes the steps of transistor-level design and simulation to generate a clean schematic design. The design flow further includes creating a layout for the simulated schematic and running layout-vs-schematic (LVS) checks and design rule checks (DRC) on the layout. LVS refers to determining whether a particular IC layout corresponds to the original schematic design, while DRC refers to determines whether the physical layout of a particular chip satisfies a series of recommended parameters called design rules. Circuit design flows are largely customized and lack full automation. Where IP re-use has been achieved, it has typically been of a 'static' or hardcoded form, thereby limiting its applications to only target locations that match the design source exactly. Alternate re-use approaches in the form of Module Generators require significant programming or scripting skills from the electronic design automation (EDA) vendor and/or the designer, and are thereby also equally limited in their application.

SUMMARY

Embodiments relate to providing "assistive" automation for circuit design via circuit stencils, thereby promoting re-use of circuit segments. To attain proliferation of a stencil-based design flow, a library of useful and self-checking circuit stencils is created. When circuit stencils are instantiated or referenced in an IC, their constituent components and/or routing may be placed without any additional hierarchy being introduced.

In one embodiment, connectivity information is received for a circuit segment in a first IC. The connectivity information indicates connections between components of the circuit segment and components of the first IC. The connectivity information is collapsed to generate reduced connectivity information for the circuit segment by analyzing functionality of the circuit segment and removing or replacing at least one redundant component or node of the circuit segment without modifying the functionality. The reduced connectivity information represents a logically compacted version of the connectivity information. A circuit stencil is generated using the reduced connectivity information. The circuit stencil is used for instantiating a circuit segment into a second IC. The circuit stencil represents an abstracted version of the circuit segment. In embodiments, the circuit stencil is used for referencing information for the at least one component in the second integrated circuit.

In one embodiment, the collapsing of the connectivity information may include replacing a parallel stack of components of the circuit segment with a single component, replacing a series of components of the circuit segment with a single component, or permuting input terminals of one or more components of the circuit segment.

In one embodiment, the circuit stencil is instantiated or referenced as at least one component into the second IC. The instantiating or referencing of the at least one component may include generating simulator checks using constraints information for simulating the second IC. The constraints information indicates design constraints for the components or nodes of the circuit segment. The instantiating or referencing of the at least one component may include generating a layout of at least a portion of the second IC corresponding to the circuit segment using the constraints information.

In one embodiment, the constraints information includes electrical assertions for the components of the circuit segment. The generating simulator checks includes translating the electrical assertions into simulator-specific circuit check statements for a circuit simulator.

In one embodiment, the constraints information includes geometric and connectivity assertions for the components of the circuit segment. The generating a layout of at least a portion of the second IC includes placing and routing physical representations of the components or nodes of the second IC corresponding to the circuit segment using the geometric and connectivity assertions.

In one embodiment, the constraints information is received from one or more of designer input commands, a symbolic editor configured to place symbolic physical representations of the components and nodes of the circuit segment, or a pattern route interface configured to place connectivity routing patterns for the components and the nodes of the circuit segment.

In one embodiment, the generating of the circuit stencil includes normalizing names of the components and the nodes of the circuit segment for inclusion in the circuit stencil.

In one embodiment, the instantiating or referencing of the at least one component circuit stencil into the second IC includes generating a mapping for the second IC. The mapping associates actual names of components and nodes of the second IC with normalized names in the circuit stencil.

In one embodiment, parameter relationships are determined between parameters of the components of the circuit segment. The determined parameter relationships are written to the circuit stencil.

In one embodiment, the determining of the parameter relationships includes identifying a component of the circuit segment having a parameter value matching an aggregate expression including a parameter value of another component of the circuit segment. The parameter value of the identified component is replaced with the aggregate expression.

In one embodiment, the determining of the parameter relationships includes selecting a subset of parameters of the components of the circuit segment from a parameter database. Parameters having same values are identified across the selected subset of parameters.

In one embodiment, the determining of the parameter relationships includes identifying components of the circuit segment whose parameter values match the same values of the identified parameters. The parameter values of the identified components are replaced with expressions representing the same values.

In one embodiment, the instantiating or referencing of the at least one component circuit stencil into the second IC includes generating a parameter value for a component of the second IC by evaluating an aggregate expression including a parameter value of a component of the circuit stencil.

In one embodiment, the circuit segment corresponds to one or more circuit stencils. Each circuit stencil corresponds to a distinct physical implementation of the circuit segment.

In one embodiment, a circuit stencil matching a criteria is searched for among the one or more circuit stencils corresponding to the circuit segment. The criteria include the generated reduced connectivity information. The criteria may include constraints information for the components or nodes of the circuit segment, parameter values for parameters of the components of the circuit segment, parameter relationships between parameters of the components of the circuit segment, a name of the circuit stencil, or a description of the circuit stencil.

In one embodiment, the circuit stencil includes the generated reduced connectivity information. The circuit stencil may include constraints information for the components or nodes of the circuit segment, normalized names of the components or the nodes of the circuit segment, parameter relationships between the parameters of the components of the circuit segment, or metadata. The metadata may include a name of the circuit stencil, a description of the circuit stencil, a path to a schematic preview image of the circuit stencil, or a path to a layout preview image of the circuit stencil.

BRIEF DESCRIPTION OF THE DRAWINGS

The teachings of the embodiments of the present invention can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to providing "assistive" automation for circuit design via circuit stencils, thereby promoting the re-use of circuit segments. To attain proliferation of a stencil-based design flow, a library of useful and self-checking circuit stencils is created. A set of connected components for a circuit segment in a first IC is selected, and metadata (e.g., a name for the stencil, a description of the intended usage, or a preview image) is provided. Information related to the circuit segment, such as component parameters, electrical assertions, schematic information, layout information, or constraints information may be written into the stencil. The stencil is stored in a library database, enabling its re-use. When circuit stencils are instantiated or referenced in an IC, their constituent components and/or routing is placed without any additional hierarchy being introduced.

A circuit stencil as described herein refers to a design abstraction of an IC segment containing a representation of reduced connectivity information for the circuit segment. The circuit stencil may also contain design constraints, normalized names of components, or parameters of the components of the circuit segment. The circuit stencil instantiation includes explicit extraction or inference of IC design intent from a first IC and application to a second IC, thereby allowing the elements of the second IC design to be implemented by learning from the first design.

EDA Design Flow

Figure 1:
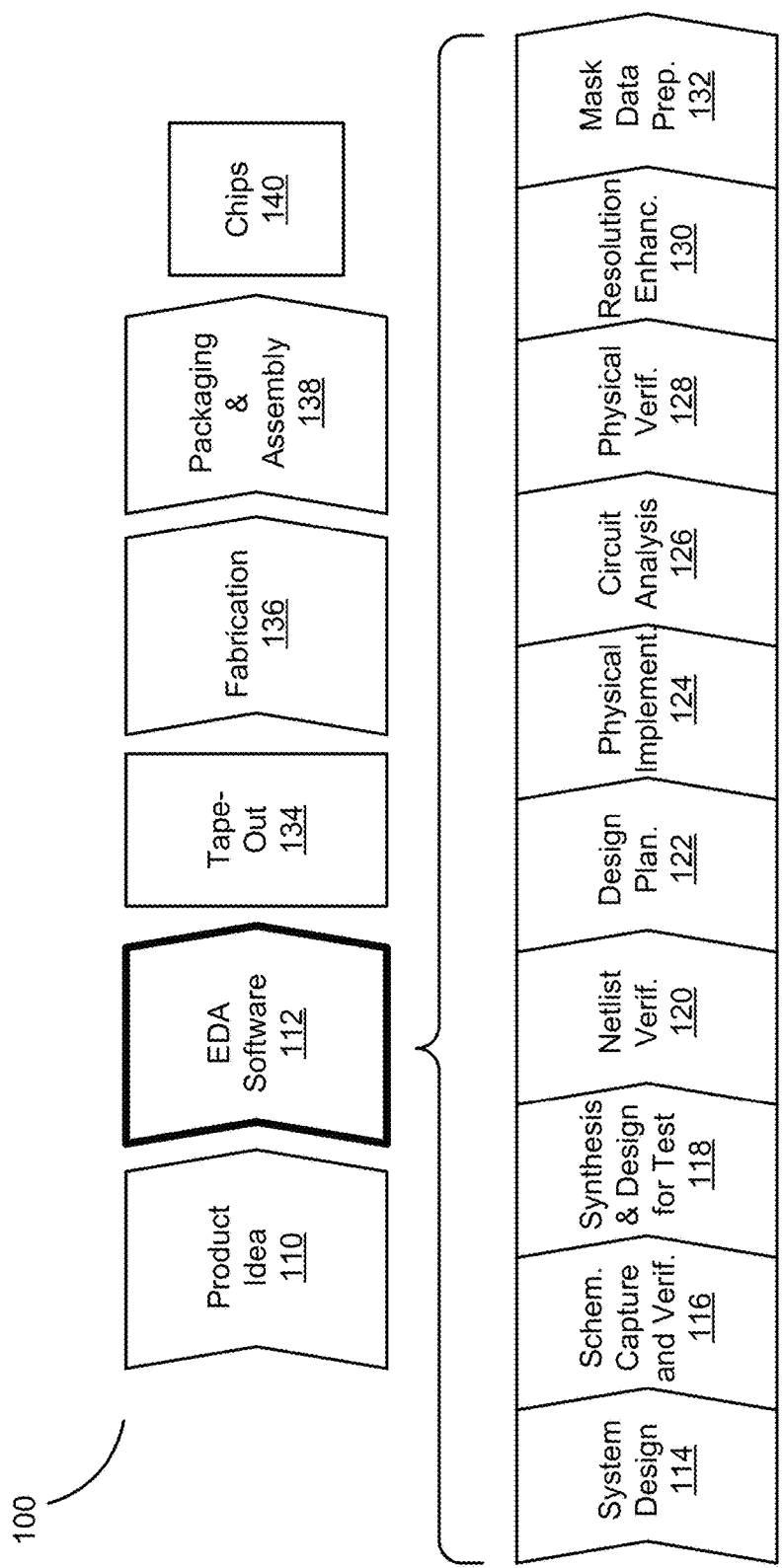
FIG. 1 is an example flow illustrating various operations for designing and fabricating an IC, in accordance with an embodiment.

FIG. 1 is an example flow 100 illustrating various operations for designing and fabricating an IC, in accordance with an embodiment. The design process 100 starts with the generation of a product idea 110, which is realized during a design process that uses electronic design automation (EDA) software 112. When the design is finalized, it can be taped-out 134. After tape-out 134, a semiconductor die is fabricated 136 to form the various objects (e.g., gates, metal layers, and vias) in the IC design. Packaging and assembly processes 138 are performed, which result in finished chips 140.

The EDA software 112 may be implemented in one or more computing devices such as the computing device 200, illustrated and described below with reference to FIG. 2. For example, the EDA software 112 is stored as instructions in a computer-readable medium which are executed by a processor for performing operations 114-132 of the design flow, which are described below. This design flow description is for illustration purposes. In particular, this description is not meant to limit the present disclosure. For example, an actual IC design may require a designer to perform the design operations in a different sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During schematic capture and verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: Custom Compiler®, VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Custom Compiler®, Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: Custom Compiler, the Astro® and IC Compiler® products. Embodiments described herein relate primarily to the physical implementation 124.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products. During physical verification 128, the design is checked to ensure correctness for: manufacturing, electrical issues, lithographic issues, and circuitry.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

The disclosed embodiments for designing of ICs based on generation and instantiation of circuit stencils may be part of, among others, the schematic capture and verification 116, the synthesis and design for test 118, or the physical implementation 124 processes.

Example Computing Device

Figure 2:
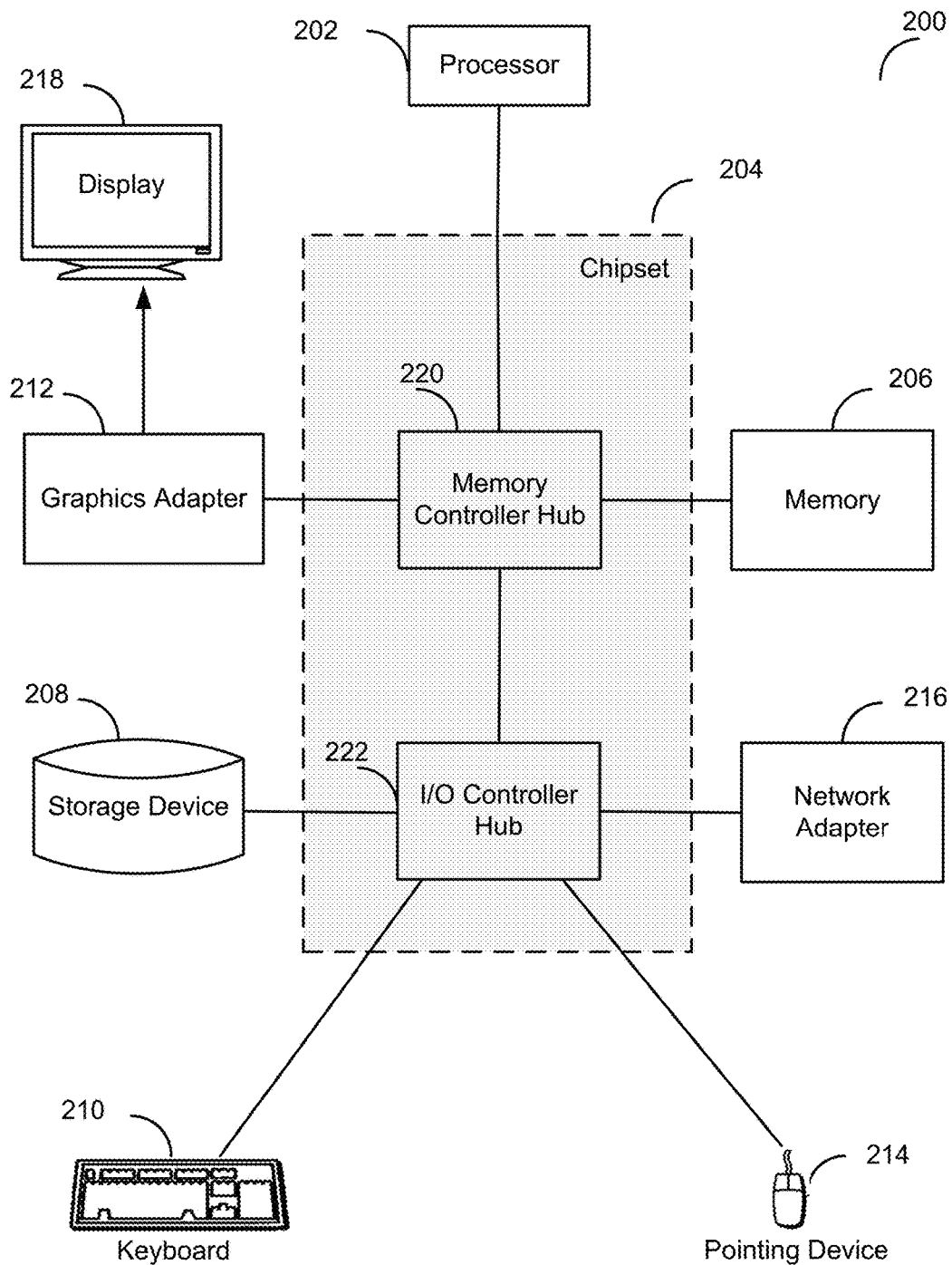
FIG. 2 is a high-level block diagram illustrating an example computing device for designing an IC, in accordance with an embodiment.

FIG. 2 is a high-level block diagram illustrating an example computing device 200 for designing an IC, in accordance with an embodiment. The computing device 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computing device 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computing device 200. The graphics adapter 212 displays images and other information on the display 218. The network adapter 216 couples the computing device 200 to one or more computer networks.

The computing device 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202. The types of computing devices 200 used can vary depending upon the embodiment and requirements. For example, a computing device may lack displays, keyboards, and/or other devices shown in FIG. 2.

The circuit design system 300 described below in detail with reference to FIG. 3 below may be embodied by the computing device 200.

Example System for Generation and Instantiation of Circuit Stencils

Figure 3:
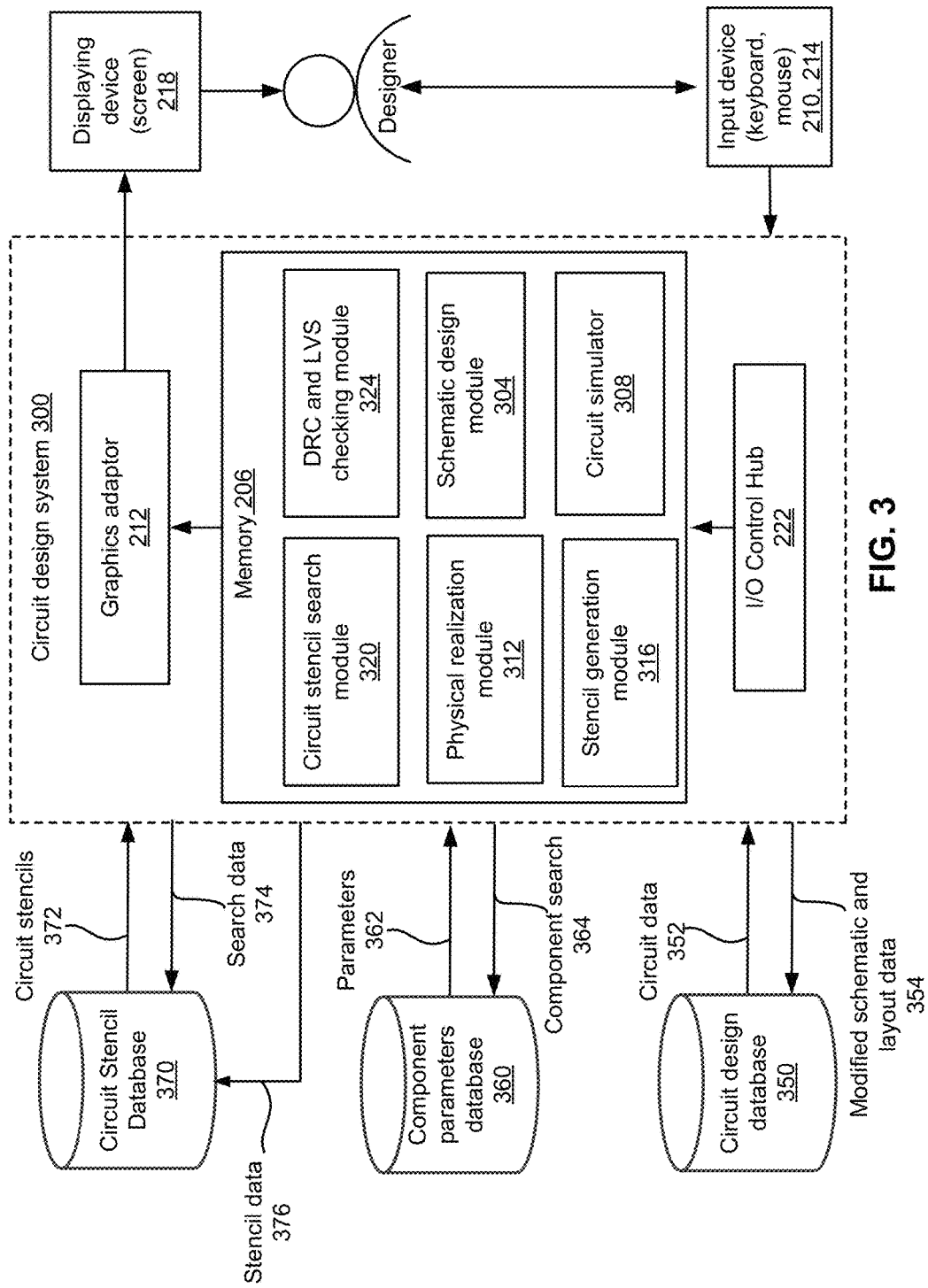
FIG. 3 is a block diagram illustrating an example system for design of ICs based on generation and instantiation of circuit stencils, according to one embodiment.

FIG. 3 is a block diagram illustrating an example system for design of ICs based on generation and instantiation of or creation of references to circuit stencils, according to one embodiment. A design flow for re-using circuit stencils enables a circuit design process to search for, filter, identify, and instantiate or create references to relevant circuit stencils in an IC design without introducing additional hierarchy. When a circuit stencil is instantiated or referenced, the schematic design process may instruct a physical realization process to "stencilize the layout," thereby enabling the subsequent re-use of layout and/or constraints information associated with the stencil during layout implementation. A uniquified "variant" of a selected circuit stencil may be stored for subsequent re-use by modifying parameter values of included components. A circuit simulation process may be instructed to automatically check the electrical constraints associated with each instantiated or referenced circuit stencil.

The circuit design system 300 may perform, among others, the operation of instantiating or referencing and routing components and connections of a circuit interactively by displaying, establishing, and modifying components and connections as the designer inputs are received. In embodiments, the circuit design system 300 may batch process the components and connections after receiving a series of designer inputs.

For this purpose, the circuit design system 300 communicates with a circuit design database 350 and interacts with a designer via input devices (e.g., keyboard 210, mouse 214) and output devices (e.g., displaying device 218). The designer inputs provided by the designer via the input devices 210, 214 may instruct the circuit design system 300 to instantiate or create a reference to a circuit stencil in a schematic of an IC, establish or modify connections to or from a circuit segment or between nodes and components of a circuit segment, and display such connections on the display 218. The circuit design system 300 communicates with a component parameter definitions database 360 to receive parameters 362 from the component parameter definitions database 360. The circuit design system 300 communicates with a circuit stencil database 370 to store the circuit stencils.

The circuit design database 350 is a database that interacts with the circuit design system 300 to store schematic and layout data 352 and modified schematic and layout data 354. The physical layout data 352, as used herein, includes physical geometric layout of patterns, schematic-layout mapping information (hereinafter referred to as "the mapping information"), number of metal layers, and physical processes associated with fabricating the circuit. The mapping information may indicate, among others, grouping of nodes in one or more circuit elements into one or more subsets of nodes, and correspondence of nodes or components in the one or more circuit elements to other nodes or components in the one or more circuit elements.

The modified schematic and physical layout data 354 is a version of the circuit data that is modified relative to the original schematic and physical layout data 352 by the interactive circuit design system 300. The physical geometric layout of patterns is a digital representation of a circuit, for example, in GDSII format. The modified schematic and physical layout data 354 includes modified placements, modified schematics, or physical geometric layout of patterns of routed connections not present in the physical geometric layout of patterns in the physical layout data 352. Additional information representing newly generated connections of the circuit may be included in modified physical layout data 354.

The circuit design database 350 may be embodied, for example, as an OpenAccess database. Although the circuit design database 350 is described as being a component separate from the interactive circuit design system 300, the circuit design database 350 may be part of the circuit design system 300. For example, the circuit design database 350 may be a module in memory 206.

The circuit design system 300 may include, among other components, an I/O controller hub 222, a memory 206, and graphics adapter 212. The I/O controller hub 222 receives designer input from the input devices 210 and 214 as well as schematic and physical layout data from the circuit design database 350 external to the interactive circuit design system 300, processes the received designer input as well as the received schematic and physical layout data, and provides the processed information to the memory 206.

The memory 206 may include, among other modules, a schematic design module 304, a circuit simulator 308, a physical realization module 312, a stencil generation module 316, a design rule checking (DRC) and layout vs schematic (LVS) module 324, and a circuit stencil search module 320. The memory 206 may include other software components (e.g., operating system) not illustrated in FIG. 3. The memory 206 may also include only a subset of these modules.

The schematic design module 304 is a software module that creates a representation of the components, nodes, and other elements of an IC (e.g., the IC 700 illustrated below with reference to FIG. 7) using abstract, graphic symbols and textual representation. The schematic design module 304 creates a schematic of an IC using symbols to represent the components and emphasizing their interconnection paths. The schematic design module 304 may include schematic capture tools and schematic entry tools. The schematic design module 304 may be integrated into the whole circuit design flow and linked to other EDA tools for verification and simulation of the circuit. The schematic design module 304 instantiates or references circuit stencils in a schematic of an IC during schematic design as illustrated and described below with reference to FIG. 7.

The circuit simulator 308 is a software module that uses mathematical models to replicate the behavior of an IC. The circuit simulator 308 may be a strictly analog electronics circuit simulator or may include both analog and event-driven digital simulation capabilities (e.g., mixed-mode simulator). An entire mixed signal analysis can be driven from one integrated schematic. The digital models in the circuit simulator 308 provide specifications of propagation time and rise/fall time delays of components and nodes in the IC. The schematic design module 304 associates connectivity, constraints, and parameters information for circuit segments in the IC via instantiation of or the creation of references to circuit stencils. For example, detailed parasitics for a circuit segment (based on an actual design layout) may be incorporated into a circuit schematic via a circuit stencil for the circuit segment. The circuit simulator 308 allows the re-use of such information in the pre-layout simulation of a target design (such as an amplifier or comparator) in which one or more instances of the circuit stencil are placed.

The physical realization module 312 is a software module that creates a representation of portions of the IC in terms of planar geometric shapes which correspond to the patterns of metal, oxide, or semiconductor layers that are included in the components of the IC. The physical realization module 312 may generate a layout of at least a portion of an IC including a stencil for a circuit segment using design constraints information in the circuit stencil. In embodiments, the physical realization module 312 may generate the layout of at least the portion of the IC in a batch operation.

The stencil generation module 316 is a software module that receives connectivity information for a circuit segment in an IC. The connectivity information indicates connections between components of the circuit segment and components of the IC. The stencil generation module 316 may also receive constraints information indicating design constraints for the components or nodes of the circuit segment. The stencil generation module 316 generates a circuit stencil, a design abstraction of the circuit segment including a representation of reduced connectivity information for the circuit segment. The stencil may also include constraints information for the components or nodes of the circuit segment, normalized names of the components or the nodes of the circuit segment, or parameter relationships between the parameters of the components of the circuit segment, as described below with reference to FIGS. 5 and 6.

Parameter definitions of components (e.g., transistor length of transistors) are stored in the component parameter definitions database 360. The component parameter definitions database 360 contains definitions of the parameters (e.g., parameter names, descriptions, default values, possible ranges of values, etc.). The component parameter definitions database 360 may also be called an interoperable component description format (iCDF) database. The stencil generation module 316 may search the component parameter definitions database 360 using parameters of devices 364, as described below in detail with reference to FIG. 6. The stencil generation module 316 receives parameters 362 from the component parameter definitions database 360.

The circuit stencil database 370 is a database that stores the circuit stencils. The connectivity information 376 in the circuit stencils is sent to the circuit stencil database 370 by the stencil generation module 316. The schematic design module 304 and the physical realization module 312 may each receive circuit stencils 372 from the circuit stencil database 370. In embodiments, circuit stencils may be stored as cells within design libraries similar to other types of design cells. Circuit stencils may be identified by the presence of a special "stencilNetlist" partition within the circuit stencil cell, which contains the stencil connectivity in a textual or netlist format. A library-level catalog may be maintained as an OpenAccess library property that lists all the circuit stencil cells within a library. Circuit stencil information may also be stored within a relational database.

The DRC and LVS checking module 324 is a software module that determines whether a physical layout of a particular chip satisfies a series of design rules. The design rules, as well known in the art, refer to general parameters recommended by semiconductor manufacturers to ensure that proper ICs can be manufactured by the semiconductor manufacturers. When the design rules are violated, the DRC and LVS checking module 324 prompts the violation to the designer for corrective actions or automatically modifies the physical layout to comply with the design rules. The DRC and LVS checking module 324 determines whether a particular IC layout created by the physical realization module 312 corresponds to the schematic of the design created by the schematic design module 304. The DRC and LVS checking module 324 examines the layers drawn to represent the circuit during layout using area-based logic operations to determine the semiconductor components represented in the drawing by their layers of construction. The DRC and LVS checking module 324 combines the extracted components into series and parallel combinations and generates a netlist representation of the layout database. The DRC and LVS checking module 324 performs a similar reduction on the schematic. The DRC and LVS checking module 324 compares the extracted layout netlist to the circuit schematic.

The circuit stencil search module 320 is a software module that enables the circuit design system 300 to search for, filter, and identify suitable circuit stencils for instantiation within an IC design. The circuit stencil search module 320 provides a search and filter capability since the total number of available circuit stencils available may be large, encompassing a significant number of common circuit "building block" topologies with both negative metal oxide semiconductor (NMOS) and positive metal oxide semiconductor (PMOS) variations, NPN and PNP bipolar variations, possibly further multiplied by low-voltage and high-voltage transistor variations or other manufacturing-process-specific variations, etc.

In some example embodiments, the system of FIG. 3 may have different and/or additional components than those described above. Additional components, such as a dedicated placement and routing tool may be added. An automatic test pattern generation module may operate in conjunction with the schematic design module 304 to generate test sequences for ICs. The databases 350, 360, and 370 may be consolidated into a single database, or any of the databases may be part of the memory 206.

Example Circuit Segment

Figure 4:
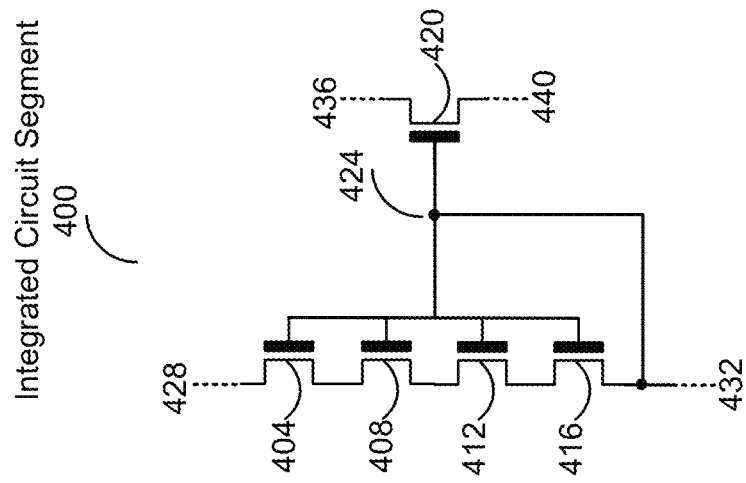
FIG. 4 is a circuit diagram of an example circuit segment, in accordance with an embodiment.

FIG. 4 is an example diagram of a circuit segment 400, in accordance with an embodiment. The stencil generation module 316 creates or opens an existing IC design (which may be complete or partially complete) containing a circuit segment of interest, for example, the circuit segment 400 in FIG. 4. In embodiments, layout designs may be used in place of schematic designs.

The circuit segment 400 represents a current mirror, which copies a current through one set of active devices by controlling the current in another set of active devices, keeping the output current constant regardless of loading. The circuit segment 400 includes a series stack of transistors 404, 408, 412, and 416. Subthreshold and gate leakage currents of transistors can be a significant contributor to power consumption in deep submicron ICs. A series stack of transistors, as shown in FIG. 4, is often designed in nanoscale ICs to reduce leakage currents and the gate leakage to total leakage ratio.

The node 428 in FIG. 4 represents the drain of the series stack and the node 432 represents the source of the series stack. The node 428 may be connected to power ("Vdd"). The node 432 may be used to load a differential pair of transistors, e.g., in an amplifier. Node 424 is connected to the gates of both the series stack and the transistor 420. The transistor 420 represents the other leg of the current mirror 400. The node 436 represents the drain of the transistor 420 and the node 440 represents the source of the transistor 420. The node 436 may be connected to power ("Vdd"). The node 440 may be used to load a differential pair of transistors, e.g., in an amplifier.

The stencil generation module 316 receives connectivity information and (optionally) design constraints information for the circuit segment 400. The connectivity information indicates connections between components of the circuit segment (e.g., that node 424 is connected to the gates of both the series stack and the transistor 420) and components of the IC (e.g., that nodes 432 and 440 may be connected to a differential pair in the IC). In an embodiment, the connectivity of the circuit segment may be encoded in a textual format, e.g., "m1 nmos {net1 bulk} {net2 gate} {net3 source} {net4 drain}." This format captures the electrical connectivity of the circuit segment in a normalized, non-graphical form. The stencil generation module 316 collapses the connectivity information to generate reduced connectivity information for the circuit segment by analyzing functionality of the circuit segment and removing or replacing at least one redundant component or node in the circuit segment without modifying the functionality. The reduced connectivity information represents a logically compacted version of the connectivity information.

The stencil generation module 316 may collapse the connectivity information of a circuit segment by (i) replacing a parallel stack of components of the circuit segment with a single component, (ii) replacing a series of components of the circuit segment with a single component, or (iii) permuting inputs of one or more components of the circuit segment. For example, power amplifiers may use a parallel stack of output transistors, which share current and have similar heat dissipation. For modeling such a circuit segment in a stencil, the stencil generation module 316 may replace the parallel stack with a single component.

Figure 5:
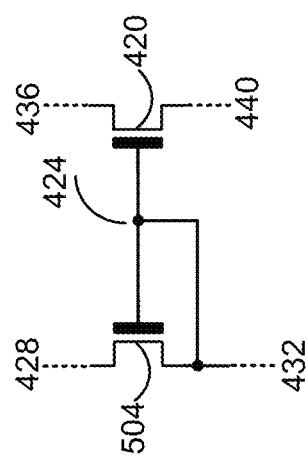
FIG. 5 is a circuit diagram illustrating example collapsed connectivity information for the circuit segment in FIG. 4, in accordance with an embodiment.

Referring to FIG. 5 below, the series stack of transistors 404, 408, 412, and 416 of the circuit segment 400 in FIG. 4 has been replaced with a single component 504 in the circuit segment 500 in FIG. 5. The connectivity information for the circuit segment 400 in FIG. 4 has been collapsed into reduced connectivity information for the circuit segment 500 as illustrated below with reference to FIG. 5. Input terminals, such as drain and source, of transistors may also be permuted to compact the connectivity using netlist reduction methods. For example, the source/drain terminals of MOS transistors may be permuted without modifying the functionality of the circuit segment to generate reduced connectivity information.

The stencil generation module 316 may also receive design constraints information for the circuit segment 400. The constraints information indicates design constraints for the components or nodes of the circuit segment, which are then written into the circuit stencil. For example, the circuit stencil may include constraints, such that it captures design intent, rather than static or hardcoded design information. This further increases the re-use potential of the circuit stencil, since it may be sourced from one design context, and then applied in other design contexts, e.g., with different transistor sizes, number of fins, etc. The incorporation of design intent via constraints in the circuit stencil differs from the prior art "static" IP-sharing approaches. Design constraints for circuit stencils are described in detail below with reference to FIG. 5.

The generated circuit stencil reflects the process of creating and then re-using an information structure for a circuit segment. Creating a circuit stencil involves receiving a large dataset (e.g., an implemented circuit segment and its parasitics with a selection of components within the circuit segment), reducing the large dataset (e.g., collapsing the connectivity information), performing inferences to determine relationships of interest between the selected components (e.g., parameter relationships, relative positioning of the instances in the layout, the patterns used to route them), and then normalizing the namespace to ensure that the relationships stored in the stencil data partitions are with respect to the normalized namespace, as described in detail below with reference to FIG. 5.

Example Representation of Collapsed Connectivity

FIG. 5 is an example diagram illustrating collapsed connectivity information for the circuit segment in FIG. 4, in accordance with an embodiment. The circuit segment 500 also represents a current mirror, however, the four series stacked transistors in FIG. 4 have been reduced to the single transistor 504 in FIG. 5. The other elements of the circuit segment 500 are the same as in the circuit segment 400 in FIG. 4 above. FIG. 5, therefore, represents the stencilized form of the circuit segment 400 in FIG. 4. The circuit stencil representation in FIG. 5 includes reduced connectivity information and (optionally) constraints information. It represents an abstracted version of the circuit segment 400 in FIG. 4 above. In embodiments, a circuit stencil may also include a static layout partition, which may be instantiated or realized into an IC design layout, thus degenerating to a static form. In embodiments, a circuit stencil may also include a static schematic partition, which may be instantiated or realized into an IC design schematic.

The constraints information in a circuit stencil may include electrical assertions for the components of the circuit segment. Simulator checks may be generated by translating the electrical assertions into simulator-specific circuit check statements for the circuit simulator 308. For example, in the current mirror 500, both transistors 504 and 420 must be in the "saturation" region of operation, which is a typical arrangement for a functional current mirror. In embodiments, additional and more complex electrical assertions may be specified, for example that the "drain-source voltage difference of the two transistors be less than a threshold" in order to avoid systematic mismatch due to channel length modulation. The stencil generation module 316 may also remove constraints before creating the circuit stencils.

Electrical assertion checks that are associated with instantiated or referenced circuit stencils may be enabled for checking by the circuit simulator 308. In the IC design flow, when a hierarchical design is selected for schematic design by the schematic design module 304, the netlisting process performed by the schematic design module 304 inspects the instance figures in each level of the schematic cell hierarchy, and writes them to a textual netlist file in a format suitable for the circuit simulator 308. For example, electrical assertions listing the intended saturation operating regions of the transistors 504 and 420 may be created in the circuit stencil. This design intent is conveyed to the circuit simulator 308 for verification purposes. The schematic design and simulation flow is therefore extended to inspect not just the schematic instance figures, but to also inspect the schematic for instantiated or referenced circuit stencils.

Specifically, the instantiated or referenced circuit stencils are identified and inspected for electrical assertions. For each such instantiated or referenced circuit stencil, if electrical assertions exist, those assertions are translated into simulator-specific circuit check statements for the circuit simulator 308. In response, the circuit simulator 308 continually checks that the transistors 504 and 420 are indeed in the saturation region of operation, reporting any divergences from this intended operating region. This "self-checking" feature enables the verification of target ICs in which circuit stencils have been instantiated or referenced.

The schematic design module 304 may select schematic transistors and then search for one (or more) matching circuit stencils having the same corresponding connectivity. The schematic design module 304 may select a circuit stencil from the circuit stencil database 370, and then search for one (or more) groups of matching schematic transistors having the same connectivity. A previously created schematic for an IC may thereby be "stencilized." The schematic may be inspected to determine whether any of its constituent circuit segments may be replaced by an instance of a stencil or a reference to a stencil. These "search and realize" or "search and re-realize" features may also be performed by schematic driven layout (SDL) generation, as described below.

The constraints information may also include geometric and connectivity assertions for the components of the circuit segment. Generating a layout of the portion of the IC may include placing and routing physical representations of the components or nodes of the IC corresponding to the circuit segment using the geometric and connectivity assertions. For example, when instantiating or referencing a circuit stencil in a target design, the schematic design module 304 may exert control over the layout that will be created to implement the target design. The schematic design module 304 may allow the physical realization module 312 a degree of control over which of the available layout or constraint partitions of the stencil to use when implementing the layout, or the schematic design module 304 may select a partition and "lock to this partition only" to restrict the physical realization module 312 to that stencilized layout partition only. In the latter case, when implementing the layout (for example using SDL), the physical realization module 312 is constrained to follow the layout constraints specified in the circuit stencil.

In embodiments where SDL is used to instantiate stencils in a layout of the IC, the physical realization module 312 may select and place a circuit stencil directly, as described above. Alternatively, the physical realization module 312 may select schematic transistors and then search for one (or more) matching circuit stencils having the same corresponding connectivity. The physical realization module 312 may select a circuit stencil from the circuit stencil database 370, and then search for one (or more) groups of matching schematic transistors having the same connectivity.

Matching circuit stencils may also be used by automated place and route tools. These tools can input the circuit stencil constraints for example, and apply or honor them when placing or routing device instances in an automated manner. For example, a constraint may require an automated placer tool to place both differential-pair transistors in a single row, or place multiple matching items in a grid of N rows by M columns, etc. A circuit stencil may require an automated routing tool to route two nets symmetrically such that their parasitics will closely match, etc. In embodiments, where there are multiple matching circuit stencils, the entire ensemble may be considered at once by the automated placement and routing tools. An embodiment also allows for all circuit stencils to be iterated over, and for each circuit stencil (which may have one or more matches), the same process is followed, for each match. This automates or aggregates the operations in a batch-like manner.

The stencil generation module 316 may receive the constraints information for a circuit segment from, for example, (i) designer input commands, (ii) a symbolic editor configured to place symbolic physical representations of the components and nodes of the circuit segment, or (iii) a pattern route interface configured to place connectivity routing patterns for the components and the nodes of the circuit segment. The stencil generation module 316 may receive constraints from designer input from the input devices 210 and 214 via the I/O controller hub 222. For example, a designer interface dialog displayed on the screen 218 may be used to create an initial selection including a set of layout figures and/or constraints. The stencil generation module 316 may save not only the circuit stencil connectivity, but also selected layout figures, constraints and/or associated schematic figures to separate stencil partitions within the newly created stencil cell. An "advanced" section of the circuit stencil metadata dialog may optionally be expanded out in order to provide parameterization and assertion (electrical constraint) information. Parameterization information may be entered via a "parameters" tab, and electrical assertions may be entered via an "assertions" tab. A parameters table may be displayed on the screen 218, pre-populated with typical parameters of interest. The stencil generation module 316 may choose not to parameterize the circuit stencil, or proceed to remove parameters, add new parameters, or rename parameters, by directly editing the contents of the table based on designer commands. Parameterization of the circuit stencils is described in detail below with reference to FIG. 6.

The symbolic editor is a software module used for digital and analog circuit layout. The symbolic editor has the ability to define constraints for multiple PMOS and NMOS row pairs for the circuit segment 500. A preview window on the symbolic editor may display what the layout will look like when realized on a layout canvas. For example, in order to make a design more compact, larger transistors may need to be folded. The symbolic editor allows the designer to fold the transistor by constraining the number of segments desired or a width threshold for the transistors. The physical realization module 312 can then select the appropriate devices and have them folded such that the transistors fit neatly in the rows. Analog ICs are typically sensitive to process variation, noise and other manufacturing variances. To mitigate the impact of these variances on critical pieces of circuitry, the symbolic editor may specify complex interdigitation pattern constraints. The symbolic editor may also retrieve constraints from a library of built-in patterns that can be used to interdigitate devices in a specific order.

The pattern route interface is a software routing interface that can infer routing patterns from existing layouts, producing and storing those patterns using constraints. The pattern route interface may retrieve pre-existing polygons corresponding to nodes and pre-existing wiring called pre-routes. The pattern route interface may create geometrical constraints, such that all nodes assigned to the same net are connected, no nodes assigned to different nets are connected, and all design rules are obeyed. To correctly connect the nets, the pattern route interface may also create constraints, such that the design meets timing, has no crosstalk problems, meets any metal density requirements, does not suffer from antenna effects, etc.

The stencil generation module 316 normalizes names of the components and the nodes of the circuit segment for inclusion in the circuit stencil. Nodes and components in the circuit stencil may have their names normalized or "uniquified" by using the name normalization method described below. The stencil generation module 316 iterates over the node structures of the IC including the circuit segment of interest. As each node is encountered, it is inspected to see if it is of interest. A node is "of interest" if it is associated with the direct interconnect of any of the components of the stencil. If the node is not associated with such a direct interconnect (e.g., nodes 424 or 428 in FIG. 4 below), it is not of interest. If the node is of interest, the node is normalized (its name replaced with the corresponding value in a node map) and written to the stencil, and the process continues to the node elements which are associated with that node. Each node element is inspected to see if its fields are of interest, and if so the "stencilization" is applied again to those node fields before writing to the stencil. Node names may be uniquified via appending of a string to their instance names before writing to the stencil. When all the nodes are exhausted, the components are traversed. Each component of interest is considered, and its instance name normalized with the corresponding value from an instance name map before writing to the stencil. In addition, its node fields are also compared with a net name map, and stenciled as for any other node item.

The generated circuit stencil includes the generated reduced connectivity information (as illustrated in FIG. 5) and (optionally) constraints information, normalized names of the components or the nodes, or parameter relationships between the parameters of the components of the circuit segment (illustrated and described in detail below with reference to FIG. 6). The circuit stencil may also include metadata, which includes one or more of a name of the circuit stencil (e.g., "ScalableCurrentMirror"), a description of the circuit stencil (e.g., "A scalable NMOS current mirror in which a ratio parameter allows the output current to be scaled relative to the reference current"), a path to a schematic preview image of the circuit stencil, or a path to a layout preview image of the circuit stencil. A thumbnail preview image may be generated for the circuit stencil, derived from the circuit segment cellview, as illustrated in FIG. 5. In embodiments, a designer may provide an alternative image instead. The preview image and the circuit stencil "description" metadata enables re-use of the circuit stencil, as described below with reference to FIG. 7.

Example Parameter Relationships in Circuit Stencil

Figure 6:
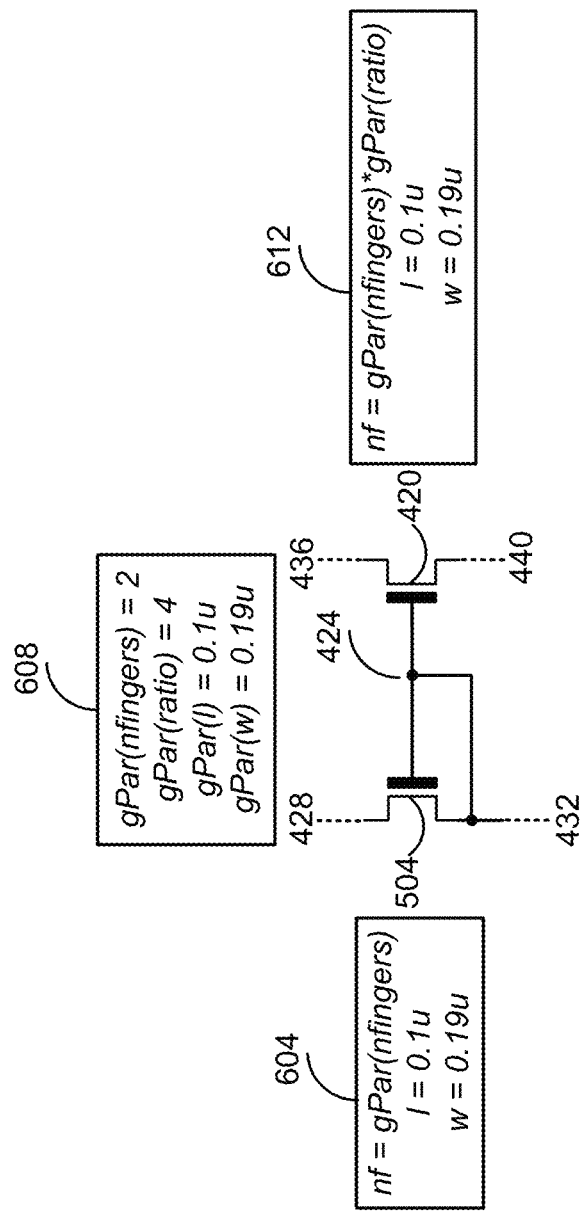
FIG. 6 is a circuit diagram illustrating example parameter relationships for the components of the circuit stencil in FIG. 5, in accordance with an embodiment.

FIG. 6 is an example diagram illustrating parameter relationships 608 for the components of the circuit segment 500, illustrated above in FIG. 5, in accordance with an embodiment. Parameters of components refer to transistor design parameters, etc., such as transistor length, and are incorporated into the circuit stencil by the stencil generation module 316.

FIG. 6 illustrates the parameters 604 for transistor 504 (reduced from the series stack of FIG. 4 above). The symbol nf of represents the number of fingers of transistor 504 and has been replaced with an expression gPar(nfingers). The symbol l represents the transistor length of transistor 504 and equals 0.1 u in this example. The symbol w represents the transistor length of transistor 504 and equals 0.19 u in this example. The symbol nf of for transistor 420 in the parameters list 612 represents the number of fingers of transistor 420 and has been replaced with an expression gPar(nfingers)*gPar(ratio). The symbol l for transistor 420 represents the transistor length of transistor 420 and equals 0.1 u in this example. The symbol w for transistor 420 represents the transistor length of transistor 420 and equals 0.19 u in this example. The expression gPar(nfingers) equals 2 in the list of parameters 608 for the circuit stencil. The value of ratio equals 4 in the list of parameters 608. Transistor 420 therefore has 4 times the number of fingers of transistor 504, i.e., 4×2=8.

The stencil generation module 316 determines parameter relationships between parameters of the components of the circuit segment and writes the determined parameter relationships to the circuit stencil. Determining the parameter relationships may include selecting a subset of parameters of the components of the circuit segment from the component parameter definitions database 360 and identifying parameters having same values across the selected subset of parameters. Determining the parameter relationships may further include identifying components of the circuit segment whose parameter values match the same values of the identified parameters and replacing the parameter values of the identified components with expressions representing the same values.

The table of parameters 608 for the circuit stencil is initially pre-populated with candidate parameters of interest. Referring again to the circuit stencil's constituent components shown in FIG. 6, there are two transistors 504 and 420 with a set of displayed parameters (nf, l, and w). A typical MOS transistor or other device may have many more parameters than this; however, these three parameters may be displayed by default as they tend to be the most directly tied to the intended functionality of the circuit shown in FIG. 6. The subsets of parameters 604 and 612 selected for "default display" for the constituent transistors are therefore the same parameters that influence the "group" of devices that are included in the circuit stencil as a whole. The parameter table 608 may be pre-populated based on a predefined property such as the "paramLabelSet" property of the iCDF database (component parameter definitions database 360) for the transistor instances that are included in the circuit stencil, for example, those shown selected in FIG. 6.

The process for identifying the best candidate parameters for the parameter pre-population process is (i) identifying the selected transistor instances (e.g., transistor 504), (ii) finding their iCDF information from the iCDF database section of a product development kit, (iii) identifying the most commonly edited parameters specified by a predefined property such as the "paramLabelSet" property of the iCDF, and (iv) determining which of those parameters have common values across the identified parameters. The iCDF information for the determined parameters is used to pre-populate the parameter table 608 for the circuit stencil. Parameters may be modified, renamed, deleted, or added by the stencil generation module 316 based on the initial "seed" set. To add parameters to the circuit stencil, a iCDF database is created and associated with the circuit stencil. The iCDF database is populated with the parameter definitions specified in table 608, allowing the circuit stencil-level parameterization to be persisted. As the circuit stencil representing FIG. 6 is saved with the metadata and parameter definitions, a new circuit stencil schematic cellview is created within the circuit stencil cell to store a copy of the schematic figure instances and their connectivity as shown in FIG. 6. The circuit stencil schematic cellview may be edited by a designer.

As part of the process of creating the circuit stencil schematic cellview, the constituent device instances (transistors 504 and 420) are traversed, and their instance parameters 604 and 612 are inspected to check whether they were retained (though possibly given different names and default values) as the parameters in table 608. To perform this inspection, the table 608 and its associated data structure may also include extra columns representing the original device parameter names and default values. For those constituent devices (e.g., transistors 504 and 420) in the circuit stencil schematic cellview of represented in FIG. 6, which have device instance parameters that match (e.g., parameter l), the corresponding device instance parameter values may be substituted with a gPar( ) reference to the corresponding circuit stencil parameter in table 608. For example, the schematic circuit stencil cellview in FIG. 6 may be queried for the value of the "l" parameter (with prompt "length") on the selected device instance 604. As a result of the substitution process above, the value of the "l" parameter on instance 504 may be changed from a numerical value of 0.1 u to an expression "gPar(l)" Here, gPar(l) denotes a reference to a "group Parameter" named l.

The results of the substitution are illustrated in table 608. A similar substitution may be made for transistor 420, such that both transistors' length parameter share a reference to the same group parameter l. If the group parameter l is assigned a different value when the circuit stencil is instantiated or referenced in an IC design, both instances will take the same value, preserving their matching properties in a manner that is correct by construction.

The stencil generation module 316 may identify a component of the circuit segment having a parameter value matching an aggregate expression including a parameter value of another component of the circuit segment. The stencil generation module 316 may replace the parameter value of the identified component with the aggregate expression. For example, in table 604, the nf parameter on transistor 504 is replaced with an expression gPar(nfingers). In table 612, the nf parameter on transistor 420 is replaced with an expression gPar(nfingers)*gPar(ratio), which references two circuit stencil group parameters. Using this expression, the transistor 420 is modified so that it has a number of fingers equal to the product of the circuit stencil's nfingers parameter multiplied by the circuit stencil's ratio parameter. The effective result is a current mirror circuit stencil which provides a scaled or ratio'ed current in the mirror leg transistor with respect to the reference leg current. The actual current ratio or scale factor is determined by the value of the instantiated or referenced circuit stencil's ratio parameter when used in an IC design. In the example of FIG. 6, gPar(ratio) equals 4 and gPar(nfingers) equals 2, and therefore, gPar(nfingers)*gPar(ratio) equals 8. When the "ScalableCurrentMirror" circuit stencil has been generated, it is added to the circuit stencil database 370 for instantiation.

Example Incorporation of Circuit Stencil into Integrated Circuit

Figure 7:
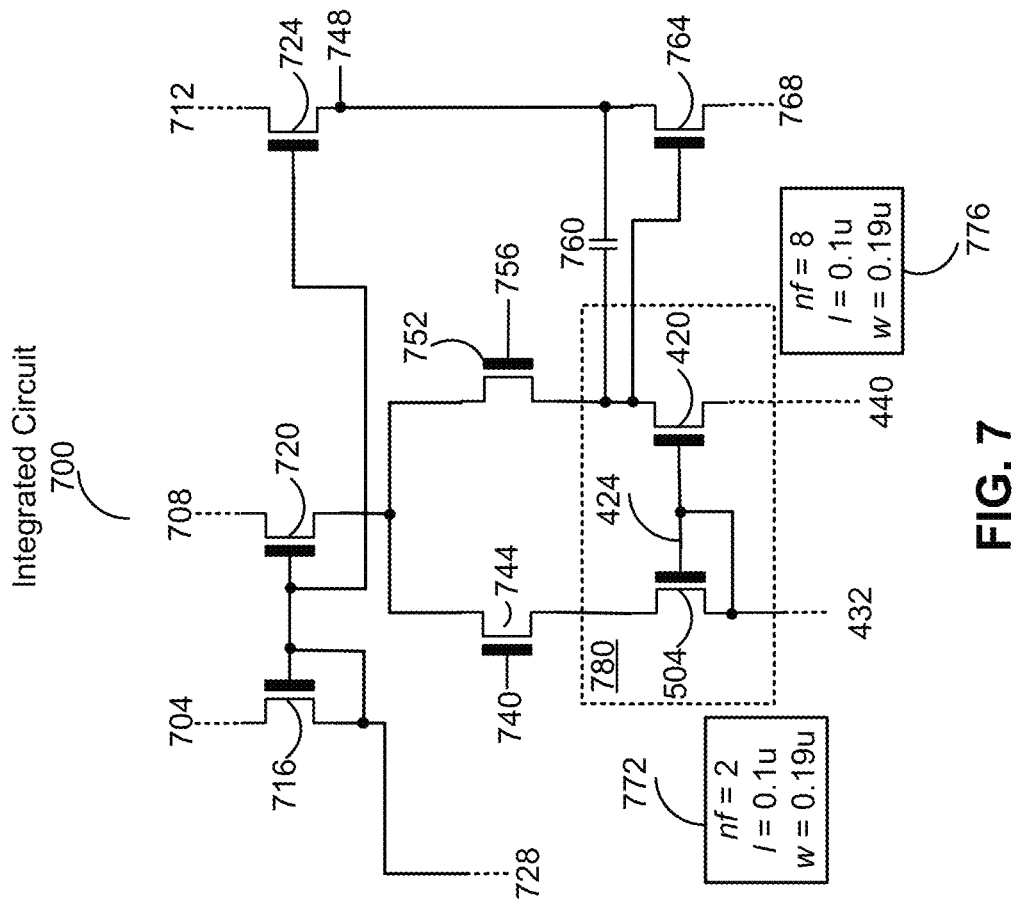
FIG. 7 is a circuit diagram illustrating instantiation of the circuit stencil of FIG. 5 into an example IC, in accordance with an embodiment.

FIG. 7 is an example diagram illustrating instantiation of the circuit stencil of FIG. 5 into an integrated circuit, in accordance with an embodiment. FIG. 7 illustrates a portion of an example multistage opamp. The integrated circuit 700 may be coupled to power supplies at nodes 704, 708, and 712. Nodes 728, 432, 440 and 768 in the integrated circuit 700 may be grounded. The nodes 740 and 756 form inputs to the integrated circuit 700. The current mirror formed by transistors 716 and 720 may supply the integrated circuit 700 with bias current. The integrated circuit 700 includes a differential pair formed by transistors 744 and 756. The second stage of the integrated circuit 700 consists of transistor 764, which is a common source amplifier actively loaded with the current source transistor 724. A capacitor 760 is included in the negative feedback path of the second stage. The output of the integrated circuit 700 is node 748.

The circuit segment for the current mirror including transistors 504 and 420 is created in the schematic of the integrated circuit 700 by instantiating or creating a reference to the stencil 780 for the circuit segment illustrated above in FIG. 5. The parameters information in the stencil 780 for the circuit segment from FIG. 6 is evaluated in the schematic for the integrated circuit 700 as tables 772 and 776.

A circuit stencil cellview need not contain any terminals. Since a circuit stencil-based flow does not require any additional hierarchy to be created, there is no need for such pins. Lingering pins from FIG. 4 above are deleted when generating the stencil. In an embodiment, any lingering pins from the selection of FIG. 4 may be deleted when realizing the schematic shapes of FIG. 5 above while instantiating the stencil 780 into the IC 700 illustrated in FIG. 7. Wire stubs may be placed, lengthened, or shortened during stencil creation to facilitate placement and connection of the circuit stencil in an IC as described below. When retrieving a circuit stencil schematic cellview, the schematic design module 304 may add in the missing terminals to complete the schematic shown in FIG. 7. When the selected circuit stencil 780 is instantiated or referenced, its corresponding circuit stencil design cellview is determined based on the information in the circuit stencil database 370 library annotation and its constituent figures are copied or generated and placed in a copy buffer. The circuit stencil shapes may be moved around in the IC design before finalizing their placement. The circuit stencil schematic figures are then copied directly into the IC schematic, with no additional cell-based hierarchy created. During instantiation, alignment markers may be generated relative to both the existing figures in the IC design of FIG. 7, and to the figures in the circuit stencil itself, as shown in FIG. 5 above. When circuit stencils are instantiated or referenced for circuit segments in an IC, their constituent devices and/or routing is placed without any additional hierarchy being introduced, unlike the traditional standard cell-based design flow.

Re-use of the circuit stencil 780 in an IC involves circuit stencil 780 realization. Standard cell re-use in a schematic or layout context involves creating an instance in an IC design which is a reference to the entire cell being re-used. For circuit stencil re-use in an IC, however, no such instance is created. Instead, the circuit stencil is realized, i.e., one or more additional objects are directly created in the IC design. For schematic design, realization is a copy operation. The schematic design module 304 copies the schematic shapes (nets, instances, and their relative layouts/positioning) from the schematic partition of the circuit stencil 780 into the IC schematic. In addition, the component and node names are renamed by mapping. The mapping associates actual names of components and nodes of the IC with normalized names in the circuit stencil 780.

When one or more instances of the circuit stencil 780 are placed in the IC design (schematic or layout), instances may be re-named to prevent clashes with existing names in the IC design. Name mapping information may be annotated onto each placed circuit stencil 780 instance. The name maps contain mappings from the placed names in the IC design to the corresponding object names in the circuit stencil 780. The names of the transistors in FIG. 4 (from which the circuit stencil 780 was created) are different than the names used for the objects written to the circuit stencil cell itself (FIG. 5), which are different from the names of the objects in the IC design (FIG. 7) into which the circuit stencil 780 is realized. A two-level name mapping is therefore employed.

For circuit stencil re-use in a layout design context, a static copy realizer may be used, much like the schematic design case where again objects from the circuit stencil cell layout are copied and name-mapped into the IC layout. In addition, a dynamic realization operation may be used. Here, the realization process involves the creation of multiple objects in the IC design layout for each object in the circuit stencil cell layout, which is no longer a 1:1 mapping between the objects in the circuit stencil 780 and the objects in the IC layout. For example, a parameter such as the number of fins of a transistor may be different in the IC than it was in the initial circuit segment or in the abstracted netlist version where these multiple objects are collapsed or merged. There can be a one-to-many relationship, a many-to-one relationship, or even a many-to-many relationship between the circuit segment design objects and the IC design objects, not simply a 1:1 relationship as is typically the case in a static copy or re-use of a standard cell. While creating these objects in the IC design layout as part of the realization process, the various relationships between the circuit stencil 780 objects (which were inferred as part of circuit stencil 780 creation) are also copied or otherwise enforced between the mapped IC design objects.

The realized objects in the target design (schematic or layout) are grouped so that they can be operated on as an atomic unit (e.g., the entire group of schematic transistor instances and their connecting wires can be moved in a single atomic operation), the group is further "tagged" identifying it as a circuit stencil, and further tagged with a reference back to the circuit stencil 780 source (e.g., FIG. 4) in case it needs to be re-realized later (e.g., with different parameter values).

Instantiating or realizing the circuit stencil 780 into the IC 700 may include generating a parameter value for a component of the IC 700 by evaluating an aggregate expression including a parameter value of a component of the circuit stencil 780. After the "ScalableCurrentMirror" circuit stencil from FIG. 5 has been selected for instantiation in IC 700, the value "4" for the current scaling ratio parameter shown in FIG. 6 may be selected. After aligning the placed "ScalableCurrentMirror" circuit stencil in IC 700, the shapes from the schematic circuit stencil cellview are copied into the IC 700 design. As part of the placement operation, an "instParams" property may be set to encode a list of (parameter, value) pairs for each parameter in the parameter tables 772 and 776 whose value differs from its iCDF parameter default value stored in the component parameter definitions database 360 and the circuit stencil cell database 370. Hence, only those circuit stencil properties whose value were overridden during stencil creation are included in the instParams property. These values are used in the gPar( ) resolution process described below. In addition to the instParams property, the names of the library and cell representing the circuit stencil master itself are also annotated as additional properties along with a "datestamp' property."

The evaluation process for the gPar( ) instance parameter values, such as gPar(nfingers)*gPar(ratio) expression for the of parameter on the selected transistor 420 illustrated in FIG. 6 above is as follows. The gPar( ) resolution process in FIG. 7 begins with an instance (e.g., transistor 504). If that instance specifies any instance parameters (e.g., nf) which in turn contain a gPar( ) reference, such as gPar(nfingers) (see FIG. 6), then the resolution process first determines if that instance is a member of a parameters group. If so, the gPar( ) reference is resolved using that group itself, i.e., the group with which the transistor instance is associated. If the evaluation process fails to resolve a reference to gPar(nf) using the transistor instance's associated group instance, the group instance is further inspected to see if it truly represents a circuit stencil (and was not created via some other unrelated process). If the group instance is identified as representing a circuit stencil instance, the evaluation process attempts to resolve it via a circuit stencil master-based search. If the stencil master-based search attempt also fails, an attempt is made to resolve the gPar( ) reference as if it were a cell-based parent parameter reference.

Starting with the instance on which the gPar( ) reference exists, the evaluation process traverses to the group of which the instance 504 is a member. The group itself is then inspected to see if it has any parameter overrides, which are encoded into a string property "instParams" on the group itself. If so, that string property is parsed as a list of (name, value) pairs, and if any of the pair names match the gPar( ) reference, the corresponding value in the matching (name, value) pair is taken as the resolved value of the gPar( ) reference for that instance, and the flow terminates.

If no override properties are found, the evaluation process attempts to resolve the gPar( ) references using an instance's group circuit stencil master. Starting with the instance on which the gPar( ) reference exists (e.g., transistor 504), the evaluation process traverses to the group of which the instance is a member. The group is then inspected to see if it has properties denoting that it came into existence via a circuit stencil placement operation. If so, the property values are used to identify the group's associated master cell, i.e., the circuit stencil's cell-based definition. That master cell is then inspected to see if it has an associated iCDF database containing a description of the parameter (e.g., nf) referenced in the gPar( ) expression. If so, the iCDF default value of that parameter is used and the resolution process terminates.

In a typical hierarchical design where a cell-based hierarchy exists, a hierarchy data structure is maintained that can be queried to determine the instance hierarchy, i.e., for any instance, the list of its child instances (all the instances within the cell corresponding to the placed instance) and their respective children. The data structure can also be traversed "in reverse," allowing a traversal from an instance to its parent instance. The cell-based parent reference approach to gPar( ) resolution uses that hierarchy data structure to traverse to the parent instance (if any) of the instance (e.g., transistor 504) containing the gPar( ) reference. If the parent instance is found, it is inspected to determine if it in turn has an instance parameter setting which specifies a value for the parameter referenced by gPar( ). If no such instance parameter setting is found, the process determines the master cell containing the transistor instance making the gPar( ) reference, and attempts to resolve the gPar( ) reference using that master cell.

In an embodiment, the evaluation process to resolve gPar( ) references based on the cell-based parent instance uses the hierarchy data structure to traverse to the parent instance (if any) of the instance containing the gPar( ) reference. If found, that parent instance is queried for a parameter with the same name as the gPar( ) reference. An OpenAccess "findParam" instance query may be used. Should the query find a parameter with the same name as the gPar( ) referenced parameter, its value is taken, and the resolution process succeeds.

Starting with the instance on which the gPar( ) reference is found, the evaluation process may determine the master cell for that instance. A standard OpenAccess get Database( ) query on the instance object may be used for this purpose. From this resulting object the library and cell objects are queried using standard OpenAccess getLibrary( ) and getCell( ) database object queries. This determines the cell master for the cell containing the instance being inspected. That master cell is then inspected to see if it has an associated iCDF database containing a description of the parameter (e.g., nf) referenced in the gPar( ) expression. If so, the iCDF default value of that parameter is taken and the resolution process is resolved/terminated. If no iCDF database exists for the group/circuit stencil master cell or a iCDF database exists but the referenced parameter does not exist within that database, the resolution process terminates.

In an embodiment, gPar( ) references may be allowed to include a default parameter value in addition to the referenced parameter name. For example, a transistor instance may specify the number of fingers as gPar(nf, 2). Here the value 2 represents a default value for the nf group parameter. The intent is to use this value if all resolution processes fail. Instead of generating an error if none of the resolution mechanisms are successful, the evaluation process instead uses the default value specified in the gPar( ) reference. The gPar(nfingers) expression for transistor 604 illustrated in FIG. 6 is resolved as described above to equal 2. The gPar(nfingers)*gPar(ratio) expression for the of parameter of 420 illustrated in FIG. 6 above is resolved as nf=2×4=8.

In one embodiment, the schematic of the IC 700 may be modified after performing simulation on the schematic of the IC 700. For example, the schematic of the IC 700 may be modified when the re-use of the circuit stencil 780 for the circuit segment from FIG. 5 reveals a design flaw in the IC 700 during simulation.

Each circuit segment (e.g., segment 500 in FIG. 5) may correspond to one or more circuit stencils generated from the circuit segment. Each such circuit stencil corresponds to a distinct physical implementation of the circuit segment. For example, the different physical implementations may correspond to different planar geometric shapes which correspond to different patterns of metal, oxide, or semiconductor layers that are included in the components of the circuit segment 500. The behavior of the final integrated circuit 700 depends on the positions and interconnections of the geometric shapes. The different physical implementations may be designed to meet different criteria in terms of performance, size, density, and manufacturability. The circuit simulator 308 may perform simulations on different schematics of the integrated circuit 700 using the different circuit stencils for each circuit stencil corresponding to the circuit segment 500. The schematic design module 304 may select one of the circuit stencils based on the simulations for instantiating or referencing in the schematic of the integrated circuit 700.

A circuit stencil library may be created to store the circuit stencils. The circuit stencil library is process-independent (i.e., the circuit stencils therein are not dependent on any particular manufacturing process). The circuit stencils in the circuit stencil library may include reduced connectivity, schematic and constraints information only, having no static layout information. In addition, schematic partitions of the circuit stencils include primitive components from a sample component library which is also process-independent. From the circuit stencil library, a process-dependent circuit stencil library may be created by copying the circuit stencil library components and modifying them to become process-specific. The primitive components in the schematic partitions may be replaced by specific components from a manufacturing process library, and layouts may be generated using the reduced connectivity and the constraints in the circuit stencil library in addition to process-specific information (e.g., layer information, a library of process-specific transistor cells, mapping information etc.).

The total number of circuit stencils available to a designer may be large, encompassing a significant number of common circuit "building block" topologies with both NMOS and PMOS variations, NPN and PNP bipolar variations, low-voltage and high-voltage transistor variations, and other manufacturing-process-specific variations, etc. Prior to circuit stencil instantiation, the circuit stencil search module 320 may search the circuit stencil database 370 for a suitable current mirror circuit stencil for re-use in the IC 700 design. The search for a circuit stencil may be based on criteria including the generated reduced connectivity information and one or more of (i) constraints information (e.g., as described above with reference to FIG. 5), (ii) parameter relationships between parameters of the components of the circuit segment (e.g., as described above with reference to FIG. 6), (iii) a name of the circuit stencil, (iv) or a description of the circuit stencil. When creating a target design, a designer may use the same circuit stencil manager interface to preview the list of available design circuit stencils on screen 218. If the target design is a schematic design, circuit stencils with available schematic partitions are included in the list. The list would therefore contain the superset of all available circuit stencils with schematic partitions and would be populated based on relational database/OpenAccess library annotations. The superset of available circuit stencils may be found by combining those in any shared database/libraries along with those in the designer's personal database/library.

Example Process for Generation and Reuse of Circuit Stencils

Figure 8:
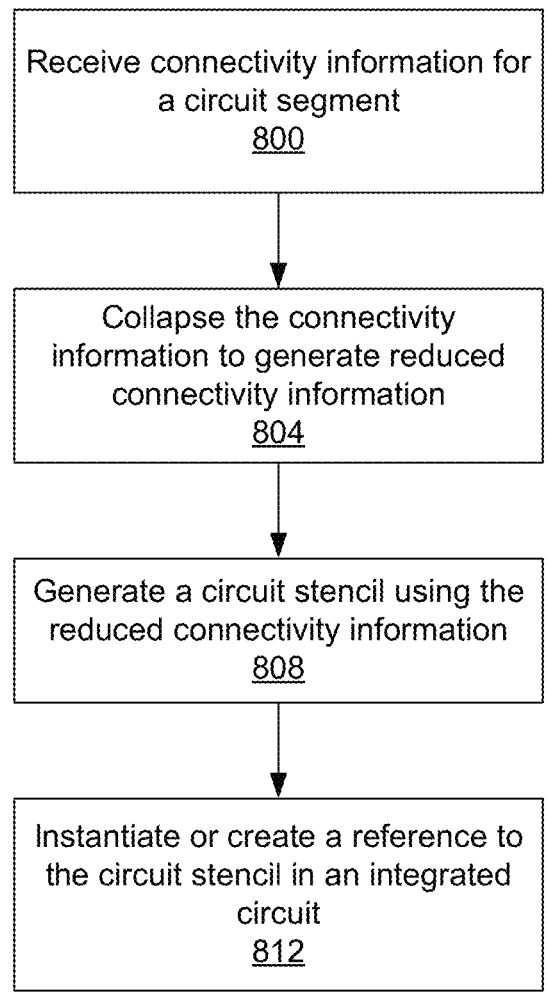
FIG. 8 is a flowchart illustrating an example process for generation and reuse of circuit stencils, in accordance with an embodiment.

FIG. 8 is a flowchart illustrating a process for generation and reuse of circuit stencils, in accordance with an embodiment. In some example embodiments, the process may have different and/or additional steps than those described in conjunction with FIG. 8. Steps of the process may also be performed in different orders than the order described in conjunction with FIG. 8. Some steps may be executed in parallel. Alternatively, some of the steps may be executed in parallel and some steps executed sequentially. Alternatively, some steps may execute in a pipelined fashion such that execution of a step is started before the execution of a previous step.

The stencil generation module 316 receives 800 connectivity information for a circuit segment in a first integrated circuit. The connectivity information indicates connections between components of the circuit segment and components of the first integrated circuit. The stencil generation module 316 may also receive constraints information. The constraints information indicates design constraints for the components or nodes of the circuit segment.

The stencil generation module 316 collapses 804 the connectivity information to generate reduced connectivity information for the circuit segment by analyzing functionality of the circuit segment and removing or replacing at least one redundant component or node in the circuit segment without modifying the functionality. The reduced connectivity information represents a logically compacted version of the connectivity information.

The stencil generation module 316 generates 808 a circuit stencil using the reduced connectivity information and (optionally) the constraints information. The circuit stencil represents an abstracted version of the circuit segment.

The schematic design module 304 instantiates or creates a reference to 812 the circuit stencil into a second integrated circuit. The instantiating or referencing may include generating simulator checks using the constraints information for simulating the second integrated circuit by the circuit simulator 308. The instantiating or referencing may include generating a layout of at least a portion of the second integrated circuit corresponding to the circuit segment using the constraints information by the physical realization module 312.

The benefits and advantages of the claimed embodiments include increased efficiency across the circuit design flow by providing 'assistive' automation via the use of circuit stencils, the benefits of hierarchy and hierarchical design without imposing the user burden of dealing with hierarchical interfaces, and reduced design iterations and turnaround time.

The foregoing description of the embodiments has been presented for the purpose of illustration; it is not intended to be exhaustive or to limit the invention to the precise forms disclosed. It may be appreciated that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A computer-implemented method, comprising:
receiving information describing parameters of components of a circuit segment;
determining, from the information, parameter relationships between the parameters of the components of the circuit segment by:
identifying a component of the circuit segment having a parameter value matching an aggregate expression including a parameter value of another component of the circuit segment, and
replacing the parameter value of the identified component with the aggregate expression; and
generating a circuit stencil from the parameter relationships between the parameters of the components of the circuit segment, the circuit stencil representing an abstracted version of the circuit segment.

2. The computer-implemented method of claim 1, wherein the generating of the circuit stencil comprises:
generating a layout or schematic of at least a portion of the components of the circuit segment; and
writing the layout or schematic into the circuit stencil.

3. The computer-implemented method of claim 1, wherein the circuit stencil comprises one or more layouts or schematics of at least a portion of the components and nodes of the circuit segment, the method further comprising:
selecting one of the one or more layouts or schematics; and
performing physical realization using the selected one of the one or more layouts or schematics to instantiate the circuit stencil into an integrated circuit.

4. The computer-implemented method of claim 1, wherein the generating of the circuit stencil comprises defining a constraint in the circuit stencil for a plurality of rows of transistors of the circuit segment, the constraint comprising one or more of:
electrical assertions for the components of the circuit segment;
geometric and connectivity assertions for the components of the circuit segment; and
interdigitation patterns for the components of the circuit segment.

5. The computer-implemented method of claim 1, wherein the generating of the circuit stencil comprises:
generating geometrical and connectivity constraints for the components of the circuit segment from a layout of an integrated circuit comprising the circuit segment; and
writing the geometrical and connectivity constraints into the circuit stencil for instantiation of the circuit stencil into other integrated circuits.

6. The computer-implemented method of claim 1, wherein the generating of the circuit stencil comprises one or more of:
deleting terminal pins of the components of the circuit segment; and
placing, lengthening, or shortening wire stubs associated with the circuit segment for writing to the circuit stencil.

7. The computer-implemented method of claim 1, further comprising instantiating the circuit stencil into a schematic of an integrated circuit by adding terminal pins to the components of the circuit segment for inclusion in the schematic of an integrated circuit.

8. The computer-implemented method of claim 1, further comprising:
receiving information describing a manufacturing process;
replacing at least a portion of the components of the circuit segment in the circuit stencil with corresponding process-dependent components from the information describing the manufacturing process; and
generating a process-dependent circuit stencil for the circuit segment from the process-dependent components.

9. A computer system, comprising:
a processor; and
a memory, the memory comprising stored instructions, the instructions when executed by the processor cause the processor to:
receive information describing parameters of components of a circuit segment;
identify, based on the information, a subset of the components of the circuit segment, wherein a subset of the parameters of the subset of the components have same parameter values across the subset of the parameters;
replace the subset of the parameters of the identified subset of the components with expressions representing the same parameter values; and
generate a circuit stencil for the circuit segment comprising the expressions representing the same parameter values, the circuit stencil representing an abstracted version of the circuit segment.

10. The computer system of claim 9, wherein the generating of the circuit stencil comprises:
generating a layout or schematic of at least a portion of the components of the circuit segment; and
writing the layout or schematic into the circuit stencil.

11. The computer system of claim 9, wherein the circuit stencil comprises one or more layouts or schematics of at least a portion of the components of the circuit segment, the instructions further causing the processor to:
select one of the one or more layouts or schematics; and
perform physical realization using the selected one of the one or more layouts or schematics to instantiate the circuit stencil into an integrated circuit.

12. The computer system of claim 9, wherein the generating of the circuit stencil comprises defining constraints in the circuit stencil for a plurality of rows of transistors of the circuit segment, the constraints comprising one or more of:
electrical assertions for the components of the circuit segment;
geometric and connectivity assertions for the components of the circuit segment; and
interdigitation patterns for the components of the circuit segment.

13. The computer system of claim 9, wherein the generating of the circuit stencil comprises:
generating geometrical and connectivity constraints for the components of the circuit segment from a layout of an integrated circuit comprising the circuit segment; and
writing the geometrical and connectivity constraints into the circuit stencil for instantiation of the circuit stencil into other integrated circuits.

14. The computer system of claim 9, wherein the generating of the circuit stencil comprises one or more of:
  deleting terminal pins of the components of the circuit segment, the terminal pins used for receiving and transmitting signals by the components; and
  placing, lengthening, or shortening wire stubs associated with the circuit segment for writing to the circuit stencil.

15. The computer system of claim 9, wherein the instructions further cause the processor to:
  instantiate the circuit stencil into a schematic of an integrated circuit by adding terminal pins to the components of the circuit segment for inclusion in the schematic of the integrated circuit, the terminal pins used for receiving and transmitting signals by the components within the integrated circuit.

16. The computer system of claim 9, wherein the instructions further cause the processor to:
  receive information describing a manufacturing process;
  replace at least a portion of the components of the circuit segment in the circuit stencil with corresponding process-dependent components from the information describing the manufacturing process; and
  generate a process-dependent circuit stencil for the circuit segment from the process-dependent components.

17. A non-transitory computer-readable storage medium storing instructions thereon, the instructions when executed by a processor cause the processor to:
  receive information describing parameters of components of a circuit segment;
  determine, from the information, parameter relationships between the parameters of the components of the circuit segment by:
    identifying a component of the circuit segment having a parameter value matching an aggregate expression including a parameter value of another component of the circuit segment, and
    replacing the parameter value of the identified component with the aggregate expression; and
  generate a circuit stencil from the parameter relationships between the parameters of the components of the circuit segment, the circuit stencil representing an abstracted version of the circuit segment.

18. The non-transitory computer-readable storage medium of claim 17, wherein the circuit stencil comprises one or more layouts or schematics of at least a portion of the components and nodes of the circuit segment, the instructions further causing the processor to:
  select one of the one or more layouts or schematics; and
  perform physical realization using the selected one of the one or more layouts or schematics to instantiate the circuit stencil into an integrated circuit.

19. The non-transitory computer-readable storage medium of claim 17, wherein the generating of the circuit stencil comprises:
  generating geometrical and connectivity constraints for the components of the circuit segment from a layout of an integrated circuit comprising the circuit segment; and
  writing the geometrical and connectivity constraints into the circuit stencil for instantiation of the circuit stencil into other integrated circuits.

20. The non-transitory computer-readable storage medium of claim 17, wherein the generating of the circuit stencil comprises:
  deleting terminal pins of the components of the circuit segment; and
  placing, lengthening, or shortening wire stubs associated with the circuit segment for writing to the circuit stencil.

* * * * *